United States Patent
Ivanov

(10) Patent No.: US 8,427,948 B2
(45) Date of Patent: Apr. 23, 2013

(54) COMMUNICATIONS NETWORK

(75) Inventor: Anton R Ivanov, Cambridge (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 326 days.

(21) Appl. No.: 12/866,493

(22) PCT Filed: Jan. 30, 2009

(86) PCT No.: PCT/GB2009/000256
§ 371 (c)(1),
(2), (4) Date: Aug. 6, 2010

(87) PCT Pub. No.: WO2009/098436
PCT Pub. Date: Aug. 13, 2009

(65) Prior Publication Data
US 2010/0322248 A1    Dec. 23, 2010

(30) Foreign Application Priority Data
Feb. 7, 2008  (GB) .................................. 0802294.9

(51) Int. Cl.
*H04J 1/16* (2006.01)
(52) U.S. Cl.
USPC ........................... 370/231; 370/237; 709/232
(58) Field of Classification Search .................. 370/230, 370/231, 237, 241, 352, 389; 709/231, 232, 709/235, 234, 239
See application file for complete search history.

(56) References Cited

U.S. PATENT DOCUMENTS

| 6,400,719 B1 | 6/2002 | Chimura et al. |
| 6,438,603 B1 | 8/2002 | Ogus |

(Continued)

FOREIGN PATENT DOCUMENTS

| EP | 0 881 812 | 12/1998 |
| WO | WO 01/67664 | 9/2001 |
| WO | WO 2008/033644 | 3/2008 |

OTHER PUBLICATIONS

Search Report (1 pg.) dated May 29, 2008 issued in corresponding GB Application No. GB0802294.9.

(Continued)

*Primary Examiner* — Hassan Phillips
*Assistant Examiner* — Ajay Cattungal
(74) *Attorney, Agent, or Firm* — Nixon & Vanderhye P.C.

(57) ABSTRACT

A communications network for reliable data transfer from a first node and a second node via two channels. A first unreliable channel transfers data according to an unreliable communications protocol such as RTP. A second reliable channel transfers the same data according to a reliable communications protocol, such as TCP. At the second node, data parts missing from the data received from the first node via the unreliable channel is detected and corresponding data parts received from the first node via the reliable channel used. The RTP channel may be operated over UDP over multicast or unicast. The TCP channel may be supplemented by a multicast group or a peer-to-peer network.

16 Claims, 2 Drawing Sheets

U.S. PATENT DOCUMENTS

| | | |
|---|---|---|
| 6,831,912 B1 | 12/2004 | Sherman |
| 6,940,819 B2 * | 9/2005 | Kato .............................. 370/237 |
| 7,251,214 B2 | 7/2007 | Mark et al. |
| 2001/0030944 A1 * | 10/2001 | Kato .............................. 370/237 |
| 2002/0191604 A1 * | 12/2002 | Mitchell et al. ............... 370/389 |
| 2003/0206549 A1 | 11/2003 | Mody et al. |
| 2004/0100922 A1 | 5/2004 | Yegin |
| 6,831,912 B1 | 12/2004 | Sherman |
| 6,940,819 B2 * | 9/2005 | Kato .............................. 370/237 |
| 7,251,214 B2 | 7/2007 | Mark et al. |
| 2001/0030944 A1 * | 10/2001 | Kato .............................. 370/237 |
| 2002/0191604 A1 * | 12/2002 | Mitchell et al. ............... 370/389 |
| 2003/0206549 A1 | 11/2003 | Mody et al. |
| 2004/0100922 A1 | 5/2004 | Yegin |
| 2004/0174875 A1 | 9/2004 | Geagan et al. |
| 2005/0021821 A1 * | 1/2005 | Turnbull et al. ............... 709/232 |
| 2005/0105471 A1 * | 5/2005 | Ido et al. ........................ 370/241 |
| 2006/0193295 A1 | 8/2006 | White et al. |
| 2006/0198296 A1 * | 9/2006 | Majee et al. ................... 370/216 |
| 2006/0233193 A1 | 10/2006 | Ungermann et al. |
| 2006/0291452 A1 * | 12/2006 | Velagaleti et al. ............. 370/352 |
| 2008/0008167 A1 * | 1/2008 | Ver Steeg ....................... 370/389 |
| 2008/0062990 A1 | 3/2008 | Oran |

OTHER PUBLICATIONS

International Search Report for PCT/GB2009/000256, mailed Jun. 19, 2009.

* cited by examiner

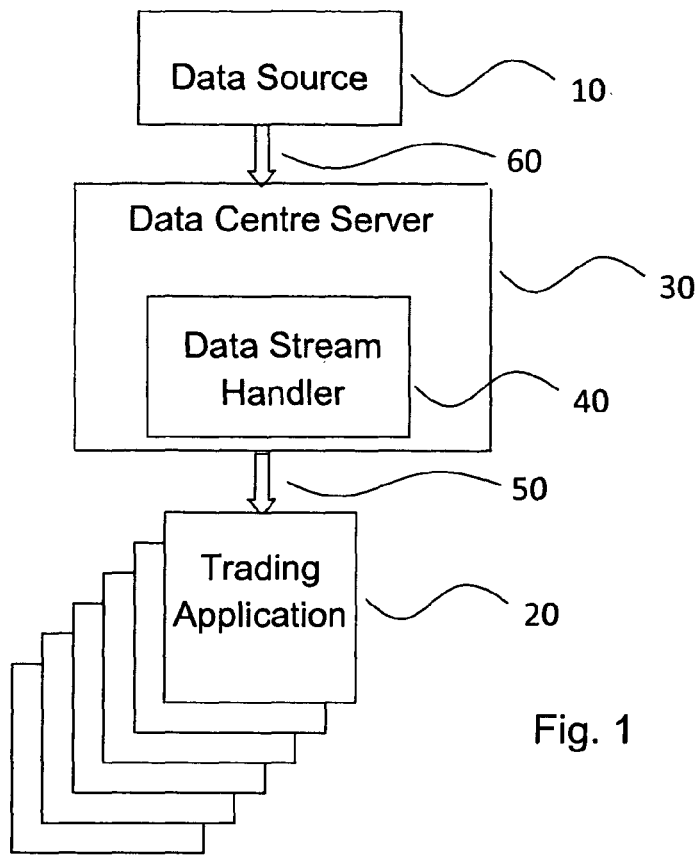
Fig. 1
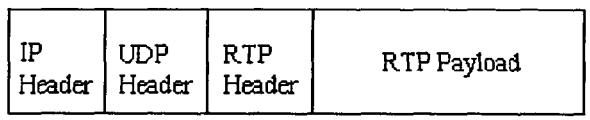
Fig. 2
| 2 | 3 | 4 | 8 | 9 | 16bit | 32bit |
|---|---|---|---|---|---|---|
| V | P | X | CSRC count | M | Payload type | Sequence number |
| Timestamp ||||||||
| Synchronization source (SSRC) ||||||||
| Contributing source (CSRC: variable 0 - 15 items, 2 octets each) ||||||||
Fig. 3

COMMUNICATIONS NETWORK

This application is the U.S. national phase of International Application No. PCT/GB2009/000256 filed 30 Jan. 2009, which designated the U.S. and claims priority to Great Britain Application No. 0802294.9, filed 7 Feb. 2008, the entire contents of each of which are hereby incorporated by reference.

BACKGROUND AND SUMMARY

The invention is directed to communications networks in general and to managing data loss in such networks. The invention has application in but is not limited to improving the distribution of critical data, such as is used in financial services, security or emergency services.

In today's financial markets, obtaining timely and accurate information is essential to performance. Financial institutions rely on high-speed, high-reliability networks to provide them with up-to-date news and price data on which trading decisions may be based. Market data delivery services have adopted a variety of different approaches. Typically, such data delivery services have been implemented using either TCP or unicast UDP. One problem with such implementations is limited scalability. Using TCP requires a separate socket (or end-point) and sliding window (or buffer) on the server for each recipient as well as a separate network stream for each client. UDP unicast requires a separate copy of the stream for each destination system. Both of these methods can quickly use up resources of the servers and the network to the point where data can be delayed for periods which are considered unacceptable. Consequently, UDP over IP multicast has been adopted by many stock exchanges to broadcast market information to subscribers and is widely considered as the only way to scale market data delivery. However, IP multicast, not being a connection-oriented mechanism, is unreliable and has no inherent mechanism for dealing with dropped packets. This may not be a problem in video or audio distribution but, for distributing critical data, a mechanism is required for efficiently managing data loss.

The invention provides for reliable communications while providing low-latency. In particular, a method is proposed of reliably transferring data via a plurality of channels in a network from a first node to a second node; in which the data comprises a plurality of parts; in which the channels comprise an unreliable channel and a reliable channel; the method including: sending the data to the second node via the unreliable channel; sending the data to the second node via the reliable channel; identifying parts of the data missing from the data received at the second node via the unreliable channel; obtaining from the data received at the second node via the reliable channel data parts corresponding to the data parts missing from the data received at the second node via the unreliable channel.

The invention preferably combines the low latency of RTP transport with the reliability of TCP and preferably provides a method in which an unreliable channel carries the data in a plurality of packets according to RTP operating over UDP; and a reliable, channel carries the data in a plurality of packets according to TCP. According to one variant, the unreliable channel operates RTP operating over UDP over multicast to a plurality of second nodes; and the reliable channel operates according to TCP to each of the plurality of second nodes. The data carried by each TCP packet preferably matches the data and RTP header carried by a corresponding one of the RTP packets.

Particular benefits derive from various detailed arrangements covering a plurality of second nodes. According to a further aspect of the invention, the unreliable channel operates according to RIP operating over UDP over multicast to a plurality N of second nodes; and the reliable channel operates over TCP to a subset M<N of the plurality N of second nodes; in which the plurality N of second nodes participate in a peer-to-peer network; in which the subset M of the second nodes receive via the reliable channel from the first node the data parts missing from the data received via the unreliable channel; and in which the remainder N-M of the plurality N of second nodes receive from one or other of the subset M of the second nodes the data parts missing from the data received via the unreliable channel.

Alternatively, the unreliable channel operates according to RTP operating over UDP over unicast to a plurality of second nodes and in which the first node and each second node participates in a peer-to-peer network used to receive from the first node the data parts missing from the data received via the unreliable channel.

According to a further aspect, the invention provides a plurality N of second nodes in which an unreliable channel operating according to RTP over UDP, is provided for each of the plurality N of second nodes and a reliable channel, operating according to TCP, is provided for each second node of a subset M<N of the plurality N of second nodes; in which the plurality N of second nodes participate in a multicast group and in which the subset M<N of the second nodes relay via the multicast group to a remainder N-M of the second nodes that are not included in the subset M<N the packets received via the reliable channels. The multicast group may use reliable multicast.

According to a further aspect, the invention includes merging the data received at the second node via the unreliable channel and the data received at the second node via the reliable channel into a single stream; identifying from the single stream the parts of the data missing from the data received at the second node via the unreliable channel; and obtaining from the single stream the data parts received at the second node via the reliable channel corresponding to the data parts missing from the data received at the second node via the unreliable channel.

The invention further provides a communications network for low-latency data transport that enjoys enhanced reliability, in particular, a communications network is provided comprising a first node and a second node; in which the first node is arranged to send data to the second node via two channels; a first unreliable channel for sending the data to the second node according to an unreliable communications protocol; and a second reliable channel for sending the data to the second node according to a reliable communications protocol; in which the data comprises a plurality of parts; in which the second node comprises a data checker for identifying data parts missing from the data received from the first node via the unreliable channel; and for obtaining from the data received from the first node via the reliable channel the data parts missing from the data received via the unreliable channel.

The invention may exploit a sequence numbering scheme to allow detection of missing data parts, in particular, in a communications network in which the data sent via the unreliable channel comprises a first series of packets in which each packet of the first series is associated with a sequence number designating a position in a sequence; in which the missing data is identified with reference to the sequence numbers. In the communications network, the data sent via the reliable channel may also comprise a second series of packets; in which each packet of the second series is associated with a sequence number designating a position in a sequence; in which each packet of the second series corresponds to one of the packets of the first series; and in which each packet of the second series is associated with the same sequence number as the corresponding packet of the first series.

BRIEF DESCRIPTION OF THE DRAWINGS

To aid understanding of the invention, embodiments will now be described by way of example, with reference to the drawings in which:

FIG. 1 is a schematic of a typical financial information system;

FIG. 2 is a schematic of a data packet for use in the financial information system of FIG. 1;

FIG. 3 is a schematic of a header structure of the data packet of FIG. 2;

DETAILED DESCRIPTION OF PRESENT EXAMPLE EMBODIMENTS

Figure 4:
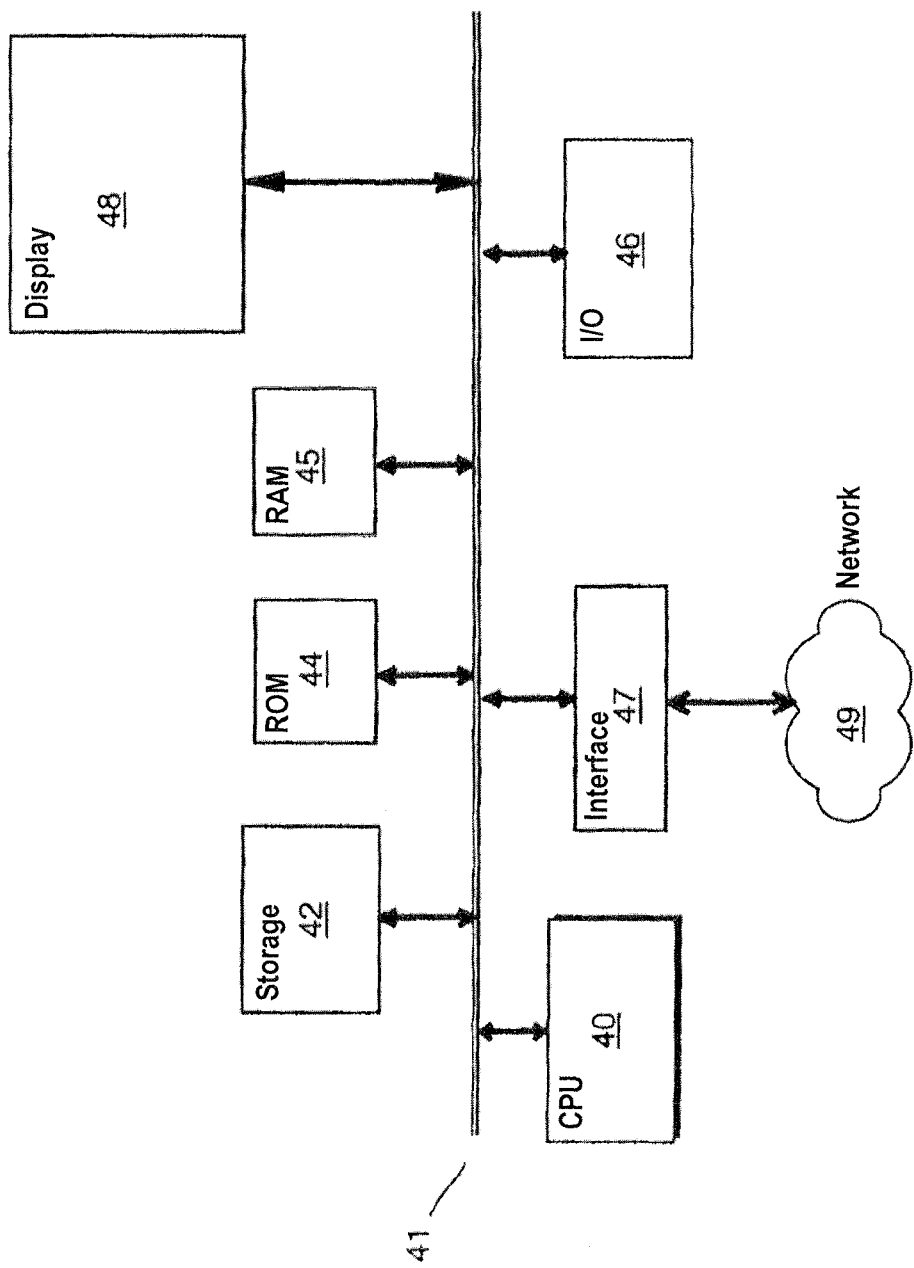
FIG. 4 is a schematic of a server for implementing the invention.

FIG. 1 shows a schematic of a financial information system to which the invention is applied according to a first embodiment. The source of the market data 10 is normally the financial exchanges where such data is generated. The destination of the market data is the trader working in a financial institution such as a brokerage or, more accurately, trading application 20 used by that trader. Market data delivery can be considered as comprising two main phases. In the first phase, the data is brought as a data stream from the financial exchange, which generates the data, into the financial institution's network. Typically, the data streams are terminated at server 30 in a data centre, which may be located on the financial institution's premises or co-located at the exchange. The data stream is then processed by data stream handler 40 on server 30, which may normalise the data stream into a common format and then republish it to an array of application servers 20 that run the trading application. Each server may handle a number of data streams.

Market data is by nature highly time-sensitive, so any delays in the data path 50, 60 between exchange 10 and trading application 20 must be minimised. In London, for example, financial institutions pick up a UDP-based IP multicast stream of market data from the LSE. However, from the financial institution server to the trading application, the data stream is retransmitted using a more reliable TCP session. By nature, this session is limited by the round-trip latency between the financial institution server and the trading application, since TCP requires acknowledgements and will request retransmission of any lost or corrupted frames, further adding to the latency.

The real-time transport protocol (RTP) is an unreliable, non-synchronous protocol that provides end-to-end delivery services for data with real-time characteristics, such as interactive audio and video or simulation data, over multicast or unicast network services. A detailed definition of RTP can be found in the Internet Engineering Task Force publication RFC 3550 of July 2003.

Applications typically run RTP on top of UDP, RTP can support data transfer to multiple destinations using multicast distribution if provided by the underlying network. RTP itself does not provide any mechanism to ensure timely delivery or provide other quality-of-service (QoS) guarantees. Instead, it provides information about packet loss, jitter and other link properties to the application, to which is left the task of compensating for quality of service problems. RTP itself does not guarantee delivery or prevent out-of-order delivery, nor does it assume that the underlying network is reliable. Although some implementations have functionality to provide for in-sequence delivery, this is not mandated by the protocol and, for these reasons, RTP does not lend itself to high-speed, high-reliability data delivery.

RTP consists of two closely-linked parts: the real-time transport protocol (RTP) and the RTP control protocol (RTCP). The real-time transport protocol (RTP), is designed to carry data that has real-time properties as well as timing data which allows the computation of the link statistics. The primary function of RTCP is to allow a participant in an RTP "conversation" to inform other participants about its observations on the link quality—delay, jitter, loss, etc. In addition, it can be used to support some application control requirements.

FIG. 2 shows a schematic of an RTP packet and its associated header information. The real-time media that is being transferred forms the 'RTP Payload'. The RTP header contains information related to the payload e.g. the source, size, encoding type etc. However, the RTP packet cannot be transferred "as is" over the network, so we use a transfer protocol called User Datagram Protocol (UDP). As shown in FIG. 2, use of the UDP requires a UDP header to be added to the RTP packet after the RTP header. The UDP datagram is then given an IP wrapper. As shown in FIG. 2, use of the IP wrapper requires an IP header to be added to the RTP packet after the UDP header.

FIG. 3 is a schematic showing the RTP header structure in more detail. In FIG. 3, the following labels are used:

V—Version. Identifies the RTP version.

P—Padding. When set, the packet contains one or more additional padding octets at the end which are not part of the payload.

X—Extension bit. When set, the fixed header is followed by exactly one header extension, with a defined format.

CSRC count—Contains the number of CSRC identifiers that follow the fixed header (see CSRC, below).

M—Marker. The interpretation of the marker is defined by a profile. It is intended to allow significant events such as frame boundaries to be marked in the packet stream.

Payload type—Identifies the format of the RTP payload and determines its interpretation by the application. A profile specifies a default static mapping of payload type codes to payload formats. Additional payload type codes may be defined dynamically through non-RTP means.

Sequence number—Increments by one for each RTP data packet sent, and may be used by the receiver to detect packet loss and to restore packet sequence.

Timestamp—Reflects the sampling instant of the first octet in the RTP data packet. The sampling instant must be derived from a clock that increments monotonically and linearly in time to allow synchronization and jitter calculations.

SSRC—Synchronization source. This identifier is chosen randomly, with the intent that no two synchronization sources within the same RTP session will have the same SSRC identifier.

CSRC—Contributing source identifiers list. Identifies the contributing sources for the payload contained in this packet.

Reliable multicast is an improvement on the unreliable multicast transmission where the receivers can request lost frames from the sender using an out-of-band channel. The loss of frames is determined through numbering all frames with a sequence number. Due to the lack of windowing and selective acknowledgements, recovery from packet loss for reliable multicast is slower than for a TCP stream. Reliable Multicast is suitable for use as a reliable transport (protocol) in place of TCP, however, TCP performs better in environments with higher probability of packet loss.

Multicast, by its very nature, is not a connection-oriented mechanism, and is inherently, unreliable, so protocols such as TCP; which allows for retransmission of missing packets, are not appropriate. Basic Multicast is aimed at applications such as streaming audio and video, where the occasional dropped packet is not a problem. But for distribution of critical data, a mechanism is required for requesting retransmission.

PGM, which is documented in IETF RFC 3208 has been proposed as a suitable mechanism for requesting retransmission in multicast. According to PGM, multicast packets are allocated sequence numbers so that, when a packet, is missed a recipient can request that the packet, identified by its sequence number, be re-multicast. However, the lack of a widely adopted system that is secure, reliable and scalable has prevented widespread adoption.

As indicated, above, with reference to FIG. 1, the data between the data centre server and the trading application is typically transported by TCP which provides in-sequence and reliable delivery of packets. The data is transported over an under-utilised network, typically working at under 5 percent of its capacity (and in some cases under 1 percent).

According to the invention, the financial data centre server to trading application link 50 is implemented by an unreliable data stream such as that provided by the RTP protocol backed up by a reliable data stream such as that provided by TCP. We are talking here about two logical channels that may or may not share the same physical medium. The logical channels may share the same physical link or may use separate links if available. The reliable data stream preferably carries the same datagrams as the unreliable data stream along with at least some of the unreliable data stream header information. Preferably, each TCP packet matches the data carried by a corresponding one of the RTP packets.

The same approach can be used to accelerate the flow of orders from the trading application to the financial data server. According to a preferred embodiment, data is sent via the unreliable data channel in preference to the reliable data channel. The preference may be implemented using priority queuing, class based queuing or any other technique which supports the notion of higher and lower priority when traffic is transmitted on a network interface or in the network as a whole. Using a data format described in a well defined protocol (such as RTP) allows for collection of performance statistics, encryption and authentication.

According to a further embodiment, the exchange 10 to financial data centre 30 data link 60 is also or alternatively implemented according to the present invention.

We shall now look at how the above solution can be put into practice.

According to a preferred embodiment, a UDP listener optimised for low latency is chosen for the trading applications 20, for example a listener based on event oriented API. The poll family of functions on Unix-like platforms and the "epoll( )" I/O event notification facility on Linux is suitable. An RTP codebase is modified to receive the incoming exchange data from data centre server 30 at trading applications 20 and to use the chosen listener.

Server 30 comprises a RTP framer that generates the RTP frames making up the data stream to the trading application. The frames from the RTP framer are transmitted in both RTP and TCP streams, either on a common link or on diverse links. According to a preferred embodiment, at the receiving end, the RTP and TCP streams are merged into a single stream before being forwarded to the trading application.

Merging may be achieved by means of a buffer for data received via the RTP stream and a sequence counter which follows the sequence numbers of the data packets received. If a gap is detected in the sequence, i.e. an expected sequence number is missing from the received packets, the system monitors the data packets received via the TCP stream and inserts the packet from the TCP stream with the missing sequence number into the buffer at the appropriate location.

According to a preferred embodiment the merge function is operated according to the following sequence:
1. Check UDP (RTP) and TCP sockets for outstanding data
2. If data present, read and parse RTP header
3. Compare RTP header sequence number with last seen RTP header sequence number.
   i. If sequence number equals to last seen sequence+1—pass to application along with any buffered data (see iii).
   ii. If sequence number less than last seen sequence number—discard
   iii. If sequence number greater than last sequence number+1, buffer data.
4. Go to step 1.

Data which is absent due to packet loss or delay in the RTP stream is obtained from the TCP stream. In the meantime arriving RTP data is buffered. As a result, trading application 20 sees an uninterrupted data flow identical to the one it would have obtained via TCP alone, but with lower latency. At the same time the recovery time after packet loss is as good as for data transmitted using a normal TCP connection.

Statistical data (e.g. information concerning round-trip delay, jitter, etc) from RTP can be provided directly to the trading application via a separate API. The statistical data from RTP can be collated with other data and used to monitor system performance.

Alternatively, each stream is provided to the trading application "as is" and the trading application performs the merging of streams and handling of packet loss. As indicated in FIG. 1, the destination trading application 20 may comprise a plurality of N trading applications, each receiving data via an unreliable RTP data stream.

According to further embodiments, the reliable delivery is not achieved solely by means of the TCP stream described above. According to one such further embodiment, the reliable TCP stream provides the data to a subset M<N of the plurality of trading applications and the plurality of trading applications 20 participate in a peer-to-peer network (not shown). The peer-to-peer network provides a means for data received via the reliable TCP stream by the subset M of the trading applications 20 to be communicated to the remaining N-M of the trading applications 20. The remaining N-M trading applications 20 receive from one or other of the subset M of the trading applications the data that is absent from the data received via the RTP stream. Advantageously, this embodiment only requires the data centre to maintain M<N TCP connections to the peer-to-peer network. While the recovery of packet loss is slower compared to previously described embodiments with a dedicated TCP connection per-trading application, this embodiment provides protection against some link failures in addition to protection against packet loss.

According to another such further embodiment, the reliable TCP stream provides the data to only a subset M<N of the plurality of trading applications and the plurality of trading applications 20 participate in a multicast group. Each of the M trading applications which have TCP connectivity to the data centre relay via the multicast group data packets received using the reliable TCP stream. While the recovery on packet loss is slower compared to previously described embodiments with a dedicated TCP connection per-trading application, this embodiment provides protection against some link failures in addition to protection against packet loss.

Using a RTP data stream with a TCP backup provides a number of significant benefits compared to TCP alone, these benefits including: lower end-to-end latency during normal operation (i.e. with no packet loss); a built-in mechanism that provides both endpoints with detailed link performance statistics; retransmission of data and reliable in-sequence delivery, comparable to pure TCP, for links with a low probability of data loss.

Additionally, in the alternative embodiment where the RTP and TCP streams are supplied to the application "as is", the trading logic can be modified so it can operate asynchronously and, advantageously, continue trading even if data has been lost.

Although described above, by way of example, with reference to financial and market data delivery services, the present invention is applicable to any communications network with sufficient capacity in which accuracy and high-speed is important, such as communications networks for the emergency services, telemetry, industrial control, etc.

Any communication system and method can lose or corrupt data whether due to factors that are external (and beyond the control of the system) or inherent in the system, i.e., by virtue of the protocol selected. The probability for loss or corruption due to inherent factors is an intrinsic characteristic of each system, which can be evaluated in advance or from measurement of system performance. The way in which a communication system (or a communication protocol operating over such a system) deals with losses leads to the definition of the system as being either reliable or unreliable. With reference to the present invention, a skilled worker would recognise a reliable communication protocol as a transport capable of transmitting data over a telecommunication system while compensating for non-deterministic losses at the rate expected based on the intrinsic loss probability in the particular telecommunication system. A reliable communication protocol should not be expected to be capable of compensating for deterministic events like human intervention or total failure of the telecommunication system. It follows that a skilled worker would recognise an unreliable communication protocol as one that is not able to compensate for non-deterministic losses at the expected rate.

As will be understood by those skilled in the art, the invention may be implemented in software, any or all of which may be contained on various transmission and/or storage media such as a floppy disc, CD-ROM, or magnetic media so that the program can be loaded onto one or more general purpose computers or could be downloaded over a computer network using a suitable transmission medium. The computer program product used to implement the invention may be embodied on any suitable carrier readable by a suitable computer input device, such as CD-ROM, optically readable marks, magnetic media, punched card or tape, or on an electromagnetic or optical signal.

As will be understood by those skilled in the art, the or each data source 10, data centre server 30 and trading application 20 may be implemented on one or more commercially available server or similar processing means. FIG. 4 shows a typical architecture for a processing means suitable for implementing the communications system according to a further embodiment of the invention. In practice, a number of such means will typically be required. The processing means comprises a central processing unit (CPU) 40 for executing software programs and managing and controlling the operation of the processing means. The CPU 40 is connected to a number of devices via a bus 41, the devices including a storage device 42, for example a hard disk drive for storing system and application software and memory devices including ROM 44 and RAM 45. The computer further includes network interfaces 47 for interfacing to external network 49. The computer can also include user input/output devices such as a mouse and keyboard (not shown) connected to the bus 41 via an input/output port 46, as well as a display 48. It will be understood by the skilled person that the above described architecture is not limiting, but is merely an example of typical processing means architecture. It will be further understood that the described processing means has all the necessary operating and application software to enable it to fulfil its purpose.

The text of the abstract is incorporated hereby: a communications network for reliable data transfer from a first node and a second node via two channels. A first unreliable channel transfers data according to an unreliable communications protocol such as RTP. A second reliable channel transfers the same data according to a reliable communications protocol, such as TCP. At the second node, data parts missing from the data received from the first node via the unreliable channel is detected and corresponding data parts received from the first node via the reliable channel used. The RTP channel may be operated over UDP over multicast or unicast. The TCP channel may be supplemented by a multicast group or a peer-to-peer network.

What is claimed is:

1. A communications network comprising:
    a first node and a second node;
    in which the first node is arranged to send data to the second node via two channels;
    a first unreliable channel for sending the data to the second node according to an unreliable communications protocol; and
    a second reliable channel for sending the data to the second node according to a reliable communications protocol:
    in which the data comprises a plurality of parts;
    in which the second node comprises a data checker for identifying data parts missing from the data received from the first node via the unreliable channel; and for obtaining from the data received from the first node via the reliable channel the data parts missing from the data received via the unreliable channel:
    in which the second node is one of a plurality N of second nodes:
    in which the unreliable channel is arranged in use to operate according to RTP operating over UDP over multicast to the plurality N of second nodes; and the reliable channel is arranged in use to operate over TCP to a subset M<N of the plurality N of second nodes;
    in which the plurality N of second nodes are arranged in use to participate in a peer-to-peer network;
    in which the subset M of the second nodes is arranged in use to receive via the reliable channel from the first node the data parts missing from the data received via the unreliable channel; and
    in which the remainder N−M of the plurality N of second nodes are arranged in use to receive from one or other of the subset M of the second nodes the data parts missing from the data received via the unreliable channel.

2. A communications network as claimed in claim 1 in which the data sent via the unreliable channel comprises a first series of packets in which each packet of the first series is associated with a sequence number designating a position in a sequence; in which the missing data is identified with reference to the sequence numbers.

3. A communications network as claimed in claim 2 in which the data sent via the reliable channel comprises a second series of packets; in which each packet of the second series is associated with a sequence number designating a position in a sequence;
   in which each packet of the second series corresponds to one of the packets of the first series; and
   in which each packet of the second series is associated with the same sequence number as the corresponding packet of the first series.

4. A communications network as claimed in claim 3 arranged in use to send each series of packets in sequence as determined by the sequence numbers.

5. A communications network as claimed in claim 3 arranged in use to send each series of packets out-of sequence and in which the second node comprises a packet sequencer for arranging in sequence packets received from the first node.

6. A communications network as claimed in claim 1 arranged in use to send data via the unreliable channel in preference to the reliable channel.

7. A communications network as claimed in claim 1, in which the unreliable channel is arranged in use to carry the data in a plurality of packets according to RTP operating over UDP; and the reliable channel is arranged in use to carry the data in a plurality of packets according to TCP.

8. A communications network as claimed in claim 1, in which the unreliable channel is arranged in use to operate according to RTP operating over UDP over multicast to a plurality of second nodes; and the reliable channel is arranged in use to operate according to TCP to each of the plurality of second nodes.

9. A communications network as claimed in claim 1, in which the unreliable channel is arranged in use to operate according to RTP operating over UDP over unicast to a plurality of second nodes and in which the first node and each second node is arranged in use to participate in a peer-to-peer network used to receive from the first node the data parts missing from the data received via the unreliable channel.

10. A communications network comprising:
   a first node and a second node;
   in which the first node is arranged to send data to the second node via two channels;
   a first unreliable channel for sending the data to the second node according to an unreliable communications protocol; and
   a second reliable channel for sending the data to the second node according to a reliable communications protocol;
   in which the data comprises a plurality of parts;
   in which the second node comprises a data checker for identifying data parts missing from the data received from the first node via the unreliable channel; and for obtaining from the data received from the first node via the reliable channel the data parts missing from the data received via the unreliable channel;
   in which the second node is one of a plurality N of second nodes in which an unreliable channel, arranged in use to operate according to RTP over UDP, is provided for each of the plurality N of second nodes and a reliable channel, arranged in use to operate according to TCP, is provided for each second node of a subset M<N of the plurality N of second nodes;
   in which the plurality N of second nodes are arranged in use to participate in a multicast group and in which the subset M<N of the second nodes are arranged in use to relay via the multicast group to a remainder N−M of the second nodes that are not included in the subset M<N the packets received via the reliable channels.

11. A method of reliably transferring data via a plurality of channels in a network from a first node to a second node; in which the data comprises a plurality of parts: in which the channels comprise an unreliable channel and a reliable channel; the method including:
   sending the data to the second node via the unreliable channel; sending the data to the second node via the reliable channel;
   identifying parts of the data missing from the data received at the second node via the unreliable channel:
   obtaining from the data received at the second node via the reliable channel data parts corresponding to the data parts missing from the data received at the second node via the unreliable channel;
   in which the second node is one of a plurality N of second nodes;
   in which the unreliable channel operates according to RTP operating over UDP over multicast to the plurality N of second nodes; and the reliable channel operates over TCP to a subset M<N of the plurality N of second nodes;
   in which the plurality N of second nodes participate in a peer-to-peer network;
   in which the subset M of the second nodes receive via the reliable channel from the first node the data parts missing from the data received via the unreliable channel; and
   in which the remainder N−M of the plurality N of second nodes receive from one or other of the subset M of the second nodes the data parts missing from the data received via the unreliable channel.

12. A method as claimed in claim 11 in which the unreliable channel carries the data in a plurality of packets according to RTP operating over UDP; and the reliable channel carries the data in a plurality of packets according to TCP.

13. A method as claimed in claim 11 in which the unreliable channel operates according to RTP operating over UDP over multicast to a plurality of second nodes; and the reliable channel operates according to TCP to each of the plurality of second nodes.

14. A method as claimed in claim 11, in which the unreliable channel operates according to RTP operating over UDP over unicast to a plurality of second nodes and in which the first node and each second node participates in a peer-to-peer network used to receive from the first node the data parts missing from the data received via the unreliable channel.

15. A method as claimed in claim 11, including merging the data received at the second node via the unreliable channel and the data received at the second node via the reliable channel into a single stream;
   identifying from the single stream the parts of the data missing from the data received at the second node via the unreliable channel; and
   obtaining from the single stream the data parts received at the second node via the reliable channel corresponding to the data parts missing from the data received at the second node via the unreliable channel.

16. A method of reliably transferring data via a plurality of channels in a network from a first node to a second node: in which the data comprises a plurality of parts; in which the channels comprise an unreliable channel and a reliable channel; the method including:
   sending the data to the second node via the unreliable channel; sending the data to the second node via the reliable channel;

identifying parts of the data missing from the data received at the second node via the unreliable channel;

obtaining from the data received at the second node via the reliable channel data parts corresponding to the data parts missing from the data received at the second node via the unreliable channel;

in which the second node is one ( )a plurality N of second nodes in which an unreliable channel operating according to RTP over UDP, is provided for each of the plurality N of second nodes and a reliable channel, operating according to TCP, is provided for each second node of a subset M<N of the plurality N of second nodes;

in which the plurality N of second nodes participate in a multicast group and in which the subset M<N of the second nodes relay via the multicast group to a remainder N-M of the second nodes that are not included in the subset M<N the packets received via the reliable channels.

\* \* \* \* \*